(No Model.)
W. G. WILSON & G. ZIMMERMANN.
COMBINED SPRING BED AND FIRE ESCAPE.
No. 338,127. Patented Mar. 16, 1886.
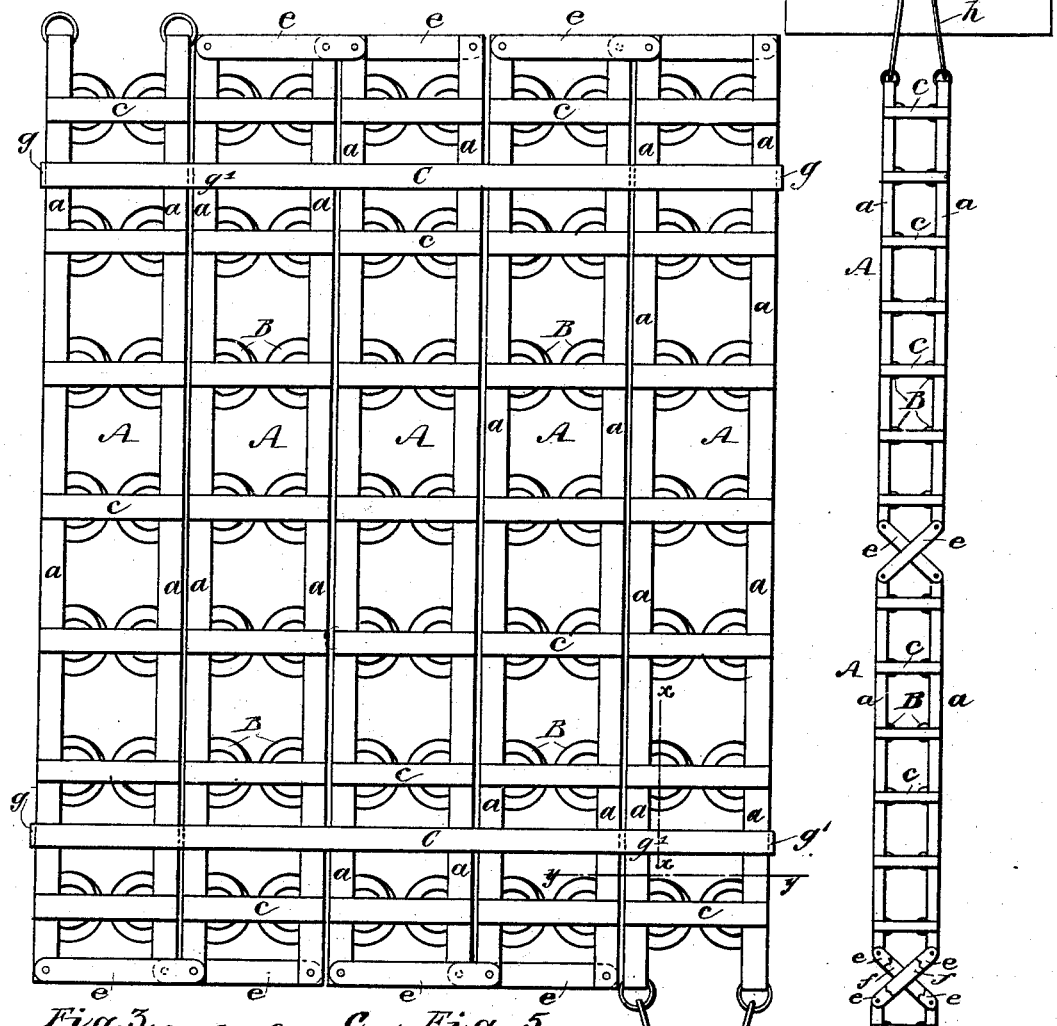
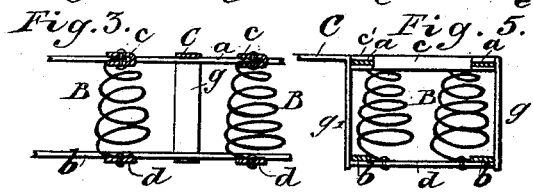
WITNESSES:
INVENTOR:
W. G. Wilson
G. Zimmermann
BY Munn & Co.
ATTORNEYS.

UNITED STATES PATENT OFFICE.

WILLIAM G. WILSON AND GEORGE ZIMMERMANN, OF PHILADELPHIA, PA.

COMBINED SPRING-BED AND FIRE-ESCAPE.

SPECIFICATION forming part of Letters Patent No. 338,127, dated March 16, 1886.

Application filed January 13, 1886. Serial No. 188,483. (No model.)

*To all whom it may concern:*

Be it known that we, WILLIAM G. WILSON and GEORGE ZIMMERMANN, both of Philadelphia, in the county of Philadelphia and State of Pennsylvania, have invented a new and Improved Combined Spring-Bed and Fire-Escape, of which the following is a full, clear, and exact description.

The object of our invention is to provide a spring-bed that can be unfolded and used as a fire-escape; and the invention consists of the construction, arrangement, and combination of parts, all as hereinafter described and claimed.

Reference is to be had to the accompanying drawings, forming part of this specification, in which similar letters of reference indicate corresponding parts in all the figures.

Figure 1 is a plan view of our invention arranged to form a bed-bottom. Fig. 2 is a front view showing the apparatus suspended from a window for use as a fire-escape. Fig. 3 is a detailed sectional view taken on the line $x\,x$ of Fig. 1. Fig. 4 is a perspective view of one of the upper cross-pieces of the apparatus; and Fig. 5 is a sectional elevation on line $y\,y$ of Fig. 1.

The apparatus is made up of several sections, A A, linked or hinged together at their ends, so as to be adapted to be folded alongside of each other in the same plane to form a bed-bottom, as shown in Fig. 1, or extended to stand endwise to each other to form a ladder, as shown in Fig. 2.

The sections A are each composed of the two upper bars or plates, $a\,a$, the two lower parallel bars or plates, $b\,b$, the upper and lower cross-plates, $c\,d$, and the springs B B, held between the upper and lower bars or plates.

The sections A A are hinged or joined together end to end by the upper crossed hinge plates, $e\,e$, that join the ends of the upper plates, $a\,a$, and the lower cross hinged plates, $f\,f$, that join the ends of the lower longitudinal plates, $b\,b$, as shown in Fig. 2. By means of the hinge-plates $e\,f$ the sections are adapted to be folded side by side, as shown in Fig. 1, and also to be extended and held end to end to form a ladder, as shown in Fig. 2.

When the sections are folded to form a bed-bottom, they are held from spreading apart by the two binding-plates C C, formed with downwardly-projecting arms $g\,g$ at their ends to reach over the outside edges of the outside sections, and the binding-plates are each provided with other downwardly-projecting arms, $g'$, to reach down between the adjacent edges of the sections, as shown in Fig. 5, so there can be no spreading or tilting sidewise of the sections. The plates C C are flexible, so as not to interfere with the elasticity of the bed.

One of the outside sections composing the apparatus is attached to the bed-post or other stationary object in the room by means of a strong cord, $h$, and hook $h'$, so the apparatus when cast out of the window will be securely suspended from the window-sill, as indicated in Fig. 2. The cross-pieces $c$ of the sections constitute the rounds, as it were, of the ladder, and in order that the feet or hands of persons descending may not be injured from contact with these cross-pieces we make them in two corresponding parts, $c'\,c'$, joined with a folded connection, $c^2$, which is curved or rounded, as shown in Figs. 3 and 4, and these cross-pieces are so attached that the rounded edges stand upward when the ladder is suspended from the window.

Constructed as described, the apparatus is practical both for a spring-bed and for a fire-escape, as it is always at hand, and can be instantly put in position for use in case of fire, and when not in use for a fire-escape it constitutes the bed-bottom, and does not occupy separate space in the room.

Having thus described our invention, what we claim as new, and desire to secure by Letters Patent, is—

1. The sections A, composed of bars $a\,b$ and cross-pieces $c\,d$, with springs B, interposed between the bars $a\,b$, in combination with the connecting-links $e\,f$, uniting the sections A, and crossing each other as the sections are extended, and means for attaching one of the sections to a permanent object, substantially as described.

2. The sections A, formed of the bars $a\,b$, and pieces $c\,d$, and springs B, the cross-pieces $c$ being rounded at one edge, as shown at $c^2$, substantially as and for the purposes set forth.

WILLIAM G. WILSON.
GEORGE ZIMMERMANN.

Witnesses:
ARCHIBALD CAMERON,
JOHN ZIMERMANN.